2,941,288

PROCESS OF MAKING NON-GALLING THREADED TITANIUM MEMBERS

Irving P. Whitehouse, South Euclid, Ohio, assignor to Republic Steel Corporation, Cleveland, Ohio, a corporation of New Jersey No Drawing. Filed Jan. 28, 1957, Ser. No. 636,518

6 Claims. (Cl. 29—420.5)

Since metallic titanium became commercially available, it has been in demand for use in many places where a combination of lightness and strength is desired, including particularly in aircraft engines. In such devices, whether they be piston or jet type, the saving of even small amounts of weight is of tremendous importance both in military aircraft and in such craft for civilian use. As a result, it is desired that bolts and/or nuts used in such devices, for example, shall be made of titanium or of some metallic mixture or alloy consisting essentially of titanium, as that term is used in this application as hereinafter set forth.

It has been found, however, that when a threaded member, such as a nut or a bolt or for that matter, other types of threaded members, are constructed of titanium or metal consisting essentially of titanium and when such a member is threadedly connected to a complementarily threaded member, there is a great tendency to "galling" or sticking. Thus, while it is possible to screw together two members, the force required to unscrew these parts is greater out of all reasonable proportion to the force used in screwing them together and sometimes is so great as wholly to prevent the unscrewing of the parts from one another. In such instances, a nut of titanium could be wholly destroyed in attempting to unscrew it or a part of the bolt could be sheared off with the nut seized thereon.

This tendency of titanium nuts or threaded parts to gall or seize is now so well known that an article has appeared in a recent edition of "The Iron Age," entitled "Plated Locknuts Reduce Galling in Titanium Parts." This article not only demonstrates that galling is a very real difficulty under these circumstances, but also demonstrates that the use of ordinary lubrication in such circumstances, while helpful, is not of sufficient assistance wholly to overcome the difficulty.

In a report entitled "Antigalling Coatings and Lubricants for Titanium," which was recently prepared by Battelle Memorial Institute, Columbus, Ohio, for the Office of Assistant Secretary of Defense for Research and Development, it was stated that all metals tend to gall to some extent, but usually some combination of lubricants and/or mating surfaces can be found which overcomes this tendency. To date, there has been little success in finding any combination of metal surface and lubricant which will give satisfactory service against bare titanium. In the experimental work covered by this report, a considerable number of different type surfaces were tried, including coatings formed by carburizing and by carbonitriding as well as oxide, phosphate, fluoride, and nitride composition coatings. These coatings were used both with and without lubricants, but in practically every instance with less than satisfactory results.

The present invention, which supplies a real answer to the difficulties aforesaid relates particularly to non-galling threaded members, consisting essentially of titanium and to a process of making such members. More particularly, the present invention relates to a threaded member, the metallic constituents of which consist essentially of titanium and which is produced by powder metallurgy process steps, so as to provide a member having from about 10% to about 30% voids, and wherein these voids are in part at least filled with a lubricant material, such as a hydrocarbon oil.

The present invention further relates to the process of making such a member, including pressing a suitable metallic powder composition, wherein the powder consists essentially of titanium, to form a green pressed blank; then sintering this blank in an atmosphere suitable therefor in view of the chemical composition of the metal, this atmosphere normally being such that there are substantially no gases present which could react with heated titanium. Following the pressing and sintering of the body, there are two process steps which may be carried out in either possible sequence. These steps include (a) impregnating the semi-porous metallic member with a lubricating material, and (b) forming a threaded portion on a selected part of this member. In a preferred embodiment of the invention, the impregnating of the member with lubricating material is carried on prior to the threading operation, so that the lubricant with which the member is impregnated can also serve in part at least to assist in the threading operation.

It has been found that a member such as a nut, a bolt, or the like made in this way and conforming to the requirements of the article hereinafter claimed has the characteristics of being substantially non-galling when threadedly connected with a complementarily threaded member.

Turning now to the particular or detailed phases of the present invention, the first requirement relates to the composition of the member forming the subject matter of this invention and which may be made as a product of the process thereof. This member, as aforesaid, is one consisting essentially of titanium. By this is meant that it is either substantially 100% titanium or it acts (as to its galling characteristics) as if it were 100% titanium. Thus, for example, it is contemplated that alloys which are predominantly, and usually over 90%, titanium with the balance aluminum and possibly also other metals, but which exhibit the same characteristics of galling when made into threaded members such as nuts or bolts and when threaded onto complementary threaded members as aforesaid, are to be included in the scope of the present invention inasmuch as they may be considered equivalent to 100% titanium (in view of their acting in the same way as to their galling character) for the purpose of the present description and the appended claims.

Metal powder having a desired composition which will be selected in view of certain characteristics desired in the final product, such as tensile strength, etc., is fabricated by a process which is essentially similar to the standard powder metallurgy process of fabricating metallic parts, with due variations as are required for the handling of the particular type material in question. Accordingly, the metal powder is placed in a suitably shaped mold and compacted therein at a pressure sufficient to give a green pressed blank having a desired apparent or bulk density, such pressure being, for example, about 60,000 to 100,000 p.s.i. (lbs. per sq. in.). It will be understood that higher pressures will give more dense blanks having smaller percentages of voids therein. Furthermore, for obtaining a blank of a given density or a given percentage of voids, consideration must be given to the physical characteristics of the particular metal powder composition used.

In any event there is produced a green pressed blank, which is thereafter sintered under conditions such that there are substantially no gases present which could react with the titanium while it is heated. It is known that heated titanium, particularly in finely divided form as a molding powder, will react very easily and in some cases almost violently, not only with oxygen of the air, but also with nitrogen, hydrogen, water vapor and some other gases. In order to have a gaseous atmosphere which will be neutral with respect to heated titanium, it is practically necessary to use argon or helium. Of these two, argon is usually preferred by reason of its lower cost and greater availability in industry. However, it is also known that the lower the absolute pressure in which the sintering takes place, the less chance there is for chemical combination between the hot titanium and any gases which remain. For this reason it is preferred in accordance with the present invention to use a high vacuum in the order of 10 to 300 microns (0.010 to 0.300 mm. of mercury), and preferably also to use argon as a sweep gas constituting the remaining atmosphere.

The resulting material, after cooling under conditions similar to that in which the sintering took place to a point where the product will not react with the ambient air, is then a sintered piece, which is semi-porous in character in that it has from about 10% to about 30% voids.

The low limit (10% voids) is chosen as a value beyond which it is difficult to go from a fabricating point of view as well as a value below which it is undesirable to go in view of the fact that it is desired, in accordance with the present invention, that there be voids remaining which may be filled in part at least with a lubricant. It is necessary, therefore, that there be a reasonable percentage of voids to provide a reasonable amount of space for the reception of the lubricant, so that the threaded member will be self-lubricating in use.

The high limit (about 30% voids) is chosen on the basis that as the percentage of voids is progressively increased, the tensile strength of the part is reduced, possibly not in a linear relationship, but certainly from a qualitative point of view. As it is essential that the parts in question shall have a reasonable minimum of strength, it is found that more than about 30% voids will, for most uses, preclude the attainment of a necessary minimum strength. It will be understood, however, for certain uses where tensile strengths of, for example, 150,000 p.s.i. are required, the percentage of voids must be held substantially lower than 30%.

Following the fabrication, as aforesaid, there are two process steps which must be accomplished: (a) the filling of a part at least of the voids with a lubricant, and (b) the forming of threads on a selected part of the member. These two process steps may be conducted in either possible order, i.e., either the lubrication step first and the threading step second, which is preferred as hereinafter set forth, or in a reverse order. The reason for preferring the lubrication step to be effected prior to the threading step is that once the lubricant is present in the part, it will be effective to assist in the threading step. Except for this, these steps could be effected in a reverse order and the final product be equally effective for the purpose of the present invention.

The lubrication step of the process is preferably accomplished by immersion of the semi-porous metal part in a lubricant, which either is or may be converted to liquid form. This lubricant is not limited to any one type, although for most purposes, a conventional hydrocarbon oil may be used. However, any desired type of lubricant known in the art may be used, or any combination thereof. In the event that an oil is used, or a lubricant which can be converted to an oil by heating, it is usual to immerse the semi-porous part in the liquid lubricant. The penetration of the lubricant into the interstices of the metal part may be facilitated by heating the lubricant and, if desired may be further facilitated by the application of a sub-atmospheric pressure above a bath of lubricant in which the parts are immersed, or both.

The step of forming threads on the part will depend as to its mode of accomplishment upon whether the threads are internal or external threads and also upon the particular use for which the part is to be made. It is contemplated according to the present invention that the threads may be cut, ground or rolled, or for that matter formed in any desired manner, which is per se no part of the present invention.

The completed part, whether the thread formation as aforesaid be effected before or after the impregnation with the lubricant, may then be used in the same manner as a threaded part may in any way and of any other material without the liability of galling or seizing with the complementarily threaded portions.

The invention is illustrated further by the examples which follow.

*Example 1*

This example illustrates the process of the present invention throughout all the steps thereof. In this example the metal present was a mixture of metal powders including 92% titanium, 4% aluminum and 4% ferrochrome. The titanium powder used had a particle size distribution of plus 35, trace; minus 35 plus 65, 8.42%; minus 65 plus 100, 38.82%; minus 100 plus 200, 40.30%; minus 200, 12.46%. The determined impurities present in this titanium powder consisted of oxygen—0.09%, hydrogen—0.0079%, nitrogen—0.003%, carbon—0.036%, iron—0.021% and chlorine—0.29%.

The aluminum power used was a so-called 99½ plus percent grade (purity). The ferro-chrome used had a particle size of —200 mesh and consisted of 75% chromium and 25% iron.

The mixed powders had admixed therewith as a metal lubricant (burnt out during the sintering) 1% stearic acid. The pressing of the mixed powders was conducted at 60,000 p.s.i. which provided a blank having a green density of about 3.75 grams per cc. The green pressed part was sintered in argon at an absolute pressure of 300 microns and with the argon used as a bleed or sweep gas. The data as to sintering include a 30 minute heating-up period, a sintering period at about 2030° F. for about one hour, and a cooling period of about 30 minutes, all under the same vacuum—argon atmosphere as aforesaid.

The sintered product had 17% voids. These voids were impregnated with a warmed hydrocarbon oil of a type commonly used as a standard household lubricant.

The product in this case was formed as an hexagonal nut formed in accordance with Army-Navy Specification No. AN–315 and having the characteristics: one-half inch, 20 NF–3 (meaning, a nut fitting a ½ in. diameter bolt, 20 National Fine threads per inch and class 3 fit).

Following the completion of the part including the impregnation thereof with oil as aforesaid, threads were cut therein by a standard tapping operation, whereupon the nut thus made was tested by threading onto a titanium bolt which was made of solid titanium formed in a conventional manner by melting and machining steps.

The nut made in accordance with the present invention as aforesaid was threaded onto a titanium bolt or stud and tightened against a shoulder thereon (comprising another nut) using a torque wrench and a torque of 1,000 inch-pounds. Similarly, a titanium nut made from a forged blank of solid titanium metal (an example of the prior art) was threaded onto a titanium stud or bolt with the same torque wrench using the same applied force. After 48 hours at room temperature, both nuts came free with a torque of 850 inch-pounds. However, when the same assemblies (stud and nut) made up in the same way in each instance were heated for 48 hours at 500° F., simulating a condition to which nuts may be exposed in aircraft engines, a very different result ensued. In this instance the forged nut (prior art construction) did not come free with an applied torque of 2,400 inch-pounds; while the nut formed in accordance with the present invention as aforesaid came free with an applied torque of 850 inch-pounds (the same as the unheated nut).

In another test using a special testing machine, a nut was arranged to be treaded back and forth on a threaded stud by a motor-driven apparatus which rotated the nut a certain distance in one direction along the stud and then the same distance in the opposite direction. The device was operated by a motor which was periodically reversed by limit and reversing switches. Using this testing machine, a lubricated nut made in accordance with the present invention ran for over 3,000 cycles with no signs of vibration or squealing due to friction. A forged titanium nut (an example of the prior art construction) was run on the same machine and began to squeal and vibrate after only 40 cycles. This same forged nut was continuously operated, notwithstanding the squealing and vibration aforesaid; but at about 200 cycles, the vibration caused the wheel carrying the nut to vibrate so seriously that the limit and reversing switches operated in an improper manner and fuses were blown in the motor circuit.

*Example II*

This example illustrates the scope of compositions which are considered to be included in the term "consisting essentially of titanium," the particular test examples which follow being intended as illustrative, but not as limiting.

Tests were made substantially as aforesaid and successful results obtained with (a) titanium alone, (b) titanium plus various amounts of aluminum from about 1% to about 5% by weight based on the total metal present, (c) titanium plus about 4% aluminum, plus from about 1% to 4% ferro-chrome as aforesaid, (d) titanium plus 4% aluminum plus about 1% to 4% manganese, (e) titanium plus about 4% aluminum plus about 1% to about 4% vanadium. In all instances non-galling threaded parts were prepared; whereas in all instances parts having the same overall chemical composition but not made according to the present invention would gall or seize when threaded onto complementarily threaded parts.

While there is herein disclosed certain non-galling threaded parts consisting essentially of titanium and a process for making such parts, it is contemplated that other equivalents in addition to those particularly described will suggest themselves to those skilled in the art from the foregoing. I do not wish to be limited, therefore, except by the scope of the appended claims, which are to be construed validly as broadly as the state of the prior art permits.

What is claimed is:

1. The process of making a threaded member, the metallic constituents of which consist essentially of titanium, and which will be substantially non-galling when threadedly engaged with a complementarily threaded member; said process comprising the steps of introducing into a mold a metallic powder consisting essentially of titanium, pressing said powder in said mold to form a green pressed blank, sintering said green pressed blank under conditions such that substantially no gases are present, which can react chemically with heated titanium, to form a member having from about 10% to about 30% voids; and thereafter and in either sequence, (a) impregnating said voids with a lubricating material, and (b) forming a threaded portion on a selected part of said member.

2. The process according to claim 1, in which said threaded member is an internally threaded nut.

3. The process in accordance with claim 1, in which said green pressed blank is sintered in a neutral gaseous atmosphere, selected from the group consisting of the gases: argon and helium.

4. The process in accordance with claim 1, in which said green pressed blank is sintered in a neutral gaseous atmosphere of argon, while maintaining said atmosphere at a total absolute pressure of about 300 microns.

5. The process in accordance with claim 1, in which the step of impregnating said voids with a lubricating material is effected prior to the step of forming a threaded portion on said member, so that the lubricating material will be effective to assist in the threading operation.

6. The process in accordance with claim 1, in which the step of impregnating said voids with a lubricating material is effected by immersing the press-formed and sintered member in a bath of a heated hydrocarbon oil, and subjecting the upper surface of said bath of oil to sub-atmospheric pressure.

References Cited in the file of this patent

UNITED STATES PATENTS

| 2,540,233 | Beaver | Feb. 6, 1951 |
| 2,549,939 | Shaw | Apr. 24, 1951 |
| 2,581,252 | Goetzel et al. | Jan. 1, 1952 |
| 2,665,960 | Causley | Jan. 12, 1954 |
| 2,672,415 | Balke | Mar. 16, 1954 |
| 2,763,519 | Thomson | Sept. 18, 1956 |

OTHER REFERENCES

"Treatise on Powder Metallurgy," by Goetzel, vol. I, 1949, page 623.